United States Patent [19]

Seghezzi et al.

[11] 4,167,886
[45] Sep. 18, 1979

[54] EXPANSION DOWEL ASSEMBLY

[75] Inventors: Hans D. Seghezzi, Vaduz, Liechtenstein; Josef Entner, Frastanz, Austria

[73] Assignee: Hilti Aktiengesellschaft, Schaan, Liechtenstein

[21] Appl. No.: 853,838

[22] Filed: Nov. 22, 1977

[30] Foreign Application Priority Data

Dec. 2, 1976 [DE] Fed. Rep. of Germany ....... 2654727

[51] Int. Cl.² .................... F16B 31/00; F16B 33/04
[52] U.S. Cl. .................................. 85/61; 85/72
[58] Field of Search ............... 85/61, 62, 72, DIG. 2, 85/1 T

[56] References Cited

U.S. PATENT DOCUMENTS

| | | | |
|---|---|---|---|
| 3,267,792 | 8/1966 | Yackle | 85/61 |
| 3,352,194 | 11/1967 | Kausen | 85/61 |
| 3,434,379 | 3/1969 | Wing | 85/61 |
| 3,602,976 | 9/1971 | Grube | 85/61 X |
| 3,728,933 | 4/1973 | Grube | 85/61 |
| 3,929,054 | 12/1975 | Gutshall | 85/61 |
| 3,978,761 | 9/1976 | Sosinski | 85/61 |

*Primary Examiner*—James T. McCall
*Attorney, Agent, or Firm*—Toren, McGeady and Stanger

[57] ABSTRACT

In an expansion dowel assembly, a stud or bolt extends through an expansion sleeve with an expanding body on one end for radially spreading the sleeve and a head or first working part on the other end for applying torque. A second working part encloses the first working part and is attached to it by one or more shear members. Torque for anchoring the sleeve in a borehole is applied through the second working part to the first working part and the stud. When a preset torque is reached, the shear members break and the second working part can move relative to the first working part without transmitting torque to the stud. A separating member is provided between the first and second working parts and after the preset torque is attained, further torque can not be applied to the stud until the separating member is removed. Preferably, the separating member consists of a flange with outstanding fingers which are in contact with the surface of the first working part against which a torque applying tool is placed. Removal of the fingers is necessary before torque can be applied to the first working part.

12 Claims, 3 Drawing Figures

EXPANSION DOWEL ASSEMBLY

SUMMARY OF THE INVENTION

The present invention is directed to an expansion dowel assembly, and, more particularly, it concerns an assembly including a separating member which prevents the application of torque to a stud or bolt until the part is removed.

The expansion anchor assembly includes an expansion sleeve, a threaded stud or bolt extending through the sleeve, an expanding body attached to the stud for spreading the sleeve when torque is applied to the stud, a first working part on the stud at the opposite end from the expansion body and through which torque can be applied, a second working part at least partly covering the first working part and connected to it by a shear device set to break upon the application of a preset torque through the second working part to the stud, and working surfaces on both of the working parts for applying torque to the stud.

Expansion dowels to be anchored into a hard receiving material, such as rock, concrete and the like, are known and the anchoring operation is effected by radially widening the expansion sleeve by means of the expanding body. Usually the expanding body has a frusto-conical outer shape and is integrally attached to the stud or is joined to it by a threaded connection. By applying torque to a working part on the end of the stud extending from the sleeve, the expanding body can be drawn axially into the sleeve for radially spreading and anchoring the sleeve in a borehole. The working part can be in the form of an integrally attached bolthead or a separate nut threaded on to the end of the stud. The sleeve is held against axial displacement by placing it in direct or indirect bearing contact with the working part on the stud.

Because there is a direct relation between the torque applied to the dowel assembly and the radial expansion of the sleeve and anchoring values of the dowel, the application of a preset torque is required to assure that sufficient anchoring values are attained in the material into which the dowel is set. The preset torque applied to the dowel assembly assures anchoring values which on one hand reach a magnitude that does not affect the receiving material in which the dowel is set, but, on the other hand, affords a magnitude that based on the load rating of the dowel connection with the receiving material assures that additional expansion can take place by a further drawing in of the expanding body into the expansion sleeve.

A preset torque can be applied to the working part of the dowel assembly by means of a torque wrench. Such wrenches, however, are expensive and sensitive to damage. Accordingly, it has also been known to provide a second working part connected to the first working part on the stud by a shear device rated to break when a preset torque value is attained. Known shear devices interconnecting the two working parts include shear pins, shear rings, or interconnections such as spot welding and the like. Each of the working parts is provided with surfaces on which a tool can be placed for applying torque to the stud. In many cases the working surfaces are in the form of a multi-sided member, such as a bolthead.

Because it is often necessary to detach a dowel, it has been known to provide both of the working parts with surfaces for applying a tool so that even though the second working part is removed, torque can be applied through the first working part. If, however, torque is applied directly to the working part mounted on the stud, whether it is for detaching or further tightening of the dowel, it leads to a departure from the preset torque and, therefore, a change in the preset anchoring values. Even though a minor detachment takes place, it is possible that the expansion dowel under load will not be able to expand again or, if additional torque is applied the material into which the sleeve is inserted may be destroyed by exceeding its breaking point with a consequent drop in the anchoring values of the dowel.

Accordingly, the optimum anchoring characteristics of the dowel can be insured only, if after the shear device breaks upon attainment of a preset torque, no further torque is transmitted through the first working part to the stud.

For safety reasons it is desirable to provide some indicator which displays whether further torque has been applied to the dowel after the preset torque has been reached. Until the present time, the marks left by a tool on the first working part have been used as the indicating means. Such marks are easily removed, however, and it is not possible to determine with any degree of certainty that a tool has been used in applying torque above the preset value.

Therefore, the primary object of the present invention is to provide a dowel assembly of the type described which is equipped with an indicating device for displaying whether a tool has been used on the first working part of the stud for applying torque above the preset value. In accordance with the present invention, the indicating device involves the use of a separating member between the working surfaces of the first working part and the second working part which prevents any application of torque to the stud until at least portions of the separating member are detached.

The separating member embodied in the present invention covers at least certain of the working surfaces on the first working part of the dowel and prevents the effective placement of a torque applying tool on the first working part. Accordingly, torque can be applied to the dowel only after the removal of a portion of the separating device and the removal of such portion is easily visually recognized so that it is simple to determine whether any further torque has been applied after the second working part has been removed from its position enclosing the first working part. In cases where the first working part is in the form of a multi-sided head, such as a hexagonal bolthead, with diametrically aligned sides, it is sufficient if only one of the aligned sides is covered by a portion of the separating member.

The separating member can be in the form of an annular flange with spaced fingers extending from the flange between the working surfaces on the first working part and the inner surface of the second working part. The removal of the fingers can be easily recognized by observation. When the separating member uses an annular flange, it is preferable if the flange is located on the surface of the first working part facing toward the expansion sleeve and is seated in a recess on that surface, then it can be safely assumed that any break in the flange represents a removal of one of the fingers and affords an indication that additional torque has been applied. By seating the flange part of the separating member in the recess it is possible to prevent any break in the flange due to axially acting forces.

Another feature of the invention is the formation of the annular flange and fingers as an integral member in somewhat the form of a cage covering a portion of the first working part directed toward the sleeve and a portion of the working surfaces on the first working part which can be in the form of a bolthead or nut. Preferably, the cage-like separating member is formed of a synthetic plastic material, such as a duroplastic or a thermoplastic having a sufficiently high softening point. Synthetic materials which can be used in forming the separating member include polyesters, aminoplastics, phenoplastics, polyvinyl chloride, polystyrene, polyacrylic resins, polyamides and the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
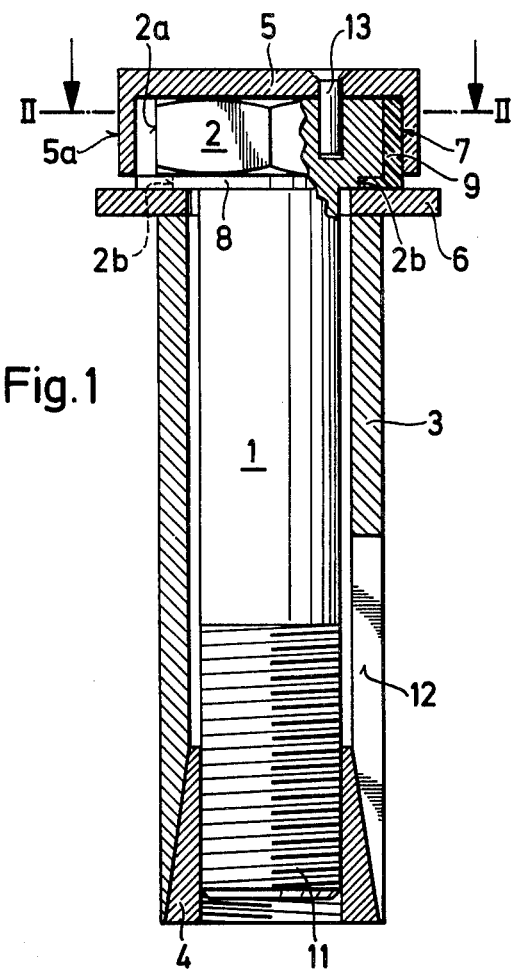
FIG. 1 is a longitudinal view, partly in section, of an expansion dowel assembly embodying the present invention.

As illustrated in FIG. 1, the expansion dowel assembly consists of a stud or bolt 1 with an integral head or first working part 2 at one of its ends. The shank portion of the bolt 1 extends through an expansion sleeve 3 and an expanding body 4 is mounted on the opposite end of the bolt from the head 2. A cap-like second working part 5 covers the outer end face and sides of the head 2. Positioned between the juxtaposed surfaces of the head 2 and the sleeve 3, is a supporting disk or washer 6. A cage-like separating member 7 includes an annular flange 8 positioned between the washer 6 and the juxtaposed surface of the head 2 and individual fingers 9 projecting from the flange in the axial direction of the bolt 1. As mentioned above, the head or first working part 2 is formed integrally with the bolt 1, that is, it is in the form of a six-sided bolt head. The expanding body 4 is frusto-conically shaped and is screwed onto a thread 11 formed on the opposite end of the bolt from its head. Expansion sleeve 3 has axially extending slots 12 extending from its end into which the expanding body is inserted. The second working part 5 which forms a cover over the sides and end face of the first working part or head 2 is connected to the head by a plurality of shear pins 13. The pins 13 are rated to break or shear when a preset torque is applied through the second working part 5 to the bolt 1 via its head 2.

Figure 3:
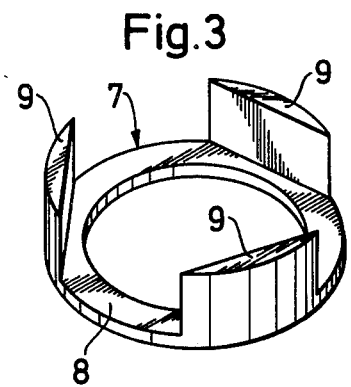
FIG. 3 is a perspective view of a cage-like separating member shown in FIGS. 1 and 2.
Figure 2:
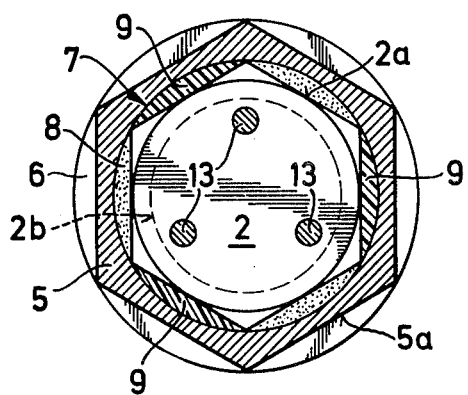
FIG. 2 is a sectional view taken along the line II—II in FIG. 1.

As shown in FIG. 2, the first working part 2 is a six-sided bolt head providing six working surfaces 2a by which a tool can be placed on the working surfaces for applying torque to the bolt 1. The working surfaces 2a are arranged in diametrically opposed pairs. One of each pair of working surfaces 2a has a finger 9 in contact with it. Each finger 9 has a segment-shaped cross-section, note FIG. 2. The surface of the head 2 facing toward the sleeve 3 has a ring-shaped recess 2b into which the flange 8 seats with the fingers extending from the flange into contact with every other one of the working surfaces 2a on the head or first working part 2. The second working part 5 has a hexagonal shape similar to that of the first working part 2 and has working surfaces 5a onto which a tool can be placed for transmitting torque to the bolt 1. In FIG. 3 the complete cage-like separating member 7 is shown in perspective with its fingers 9 extending axially outwardly from the flange 8. As shown in FIG. 2, the fingers 9 are segment-shaped so that they do not obstruct any relative movement between the second working part 5 and the head or first working part 2 after the pins 13 have been sheared upon reaching the preset torque. An important feature of the shape of the fingers 9 is that their outer surfaces have the same contour as the inwardly facing surface of the second working part 5 which inner surface is cylindrically shaped.

Instead of the embodiment shown in the drawing, where the first working part or head 2 is formed integrally with the bolt 1, the first working part can be in the form of a nut threaded onto the bolt or stud 1. In such an embodiment the expanding body 4 could be formed integrally with the stud 1 instead of being threaded onto it. Additionally, while the second working part 5 has a cap-like shape, this is shown only for purpose of example and it will be appreciated that various other shapes of the second working part could be used. Further, the pins 13 connecting the two working parts could be replaced by other types of shear devices.

While specific embodiments of the invention have been shown and described in detail to illustrate the application of the inventive principles, it will be understood that the invention may be embodied otherwise without departing from such principles.

What is claimed is:

1. An expansion dowel assembly comprising an axially elongated expansion sleeve having a first end and a second end, an axially elongated stud having a first end and a second end, said stud extending axially through said sleeve with said second end thereof located adjacent to and outwardly from the second end of said sleeve and the first end of said stud located adjacent the first end of said sleeve, an expanding body attached to the first end of said stud, a first working part secured to the second end of said stud and located outwardly from the second end of said sleeve, a second working part located outwardly of said first working part, first means connecting said second working part to said first working part and said first means arranged to break for disconnecting said second working part from said first working part when a preset torque is applied to said second working part, said first and second working parts each having working surfaces thereon for engagement by a tool for applying torque to said stud so that said expanding body is drawn into said sleeve from the first end toward the second end thereof for expanding said sleeve, wherein the improvement comprises second means positioned between said first working part and said second working part and disposed in contact with the working surfaces on said first working part for preventing attachment of a tool to the working surfaces of said first working part for exerting torque on said stud until said second means are displaced permitting the tool to engage the working surface of said first working part and to apply torque to said stud.

2. An expansion dowel assembly, as set forth in claim 1, wherein said first working part and second working part each have multi-sided working surfaces forming a circumferential periphery for the respective working part.

3. An expansion dowel assembly, as set forth in claim 2, wherein said first and second working parts each have an even number of working surfaces thereon arranged in diametrically opposed pairs and said second means being disposed in contact with at least one of each said pair of diametrically opposed surfaces on said first working part.

4. An expansion dowel assembly, as set forth in claim 3, wherein said second working part laterally encloses the working surfaces on said first working part, and said second means being positioned at least in part between and in contact with the inner surface of said second working part and and the working surfaces of said first working part.

5. An expansion dowel assembly, as set forth in claim 4, wherein said second means comprises an annular flange encircling said stud and fingers secured to said flange and extending outwardly therefrom in the axial direction of said stud with each said finger extending between one side of the working surface on said first working part and the inner surface of said second working part.

6. An expansion dowel assembly, as set forth in claim 5, wherein said fingers being angularly spaced apart around said flange.

7. An expansion dowel assembly, as set forth in claim 5, wherein said flange being located on the side of said first working part facing toward the first end of said stud.

8. An expansion dowel assembly, as set forth in claim 7, wherein the side of said first working part facing toward the first end of said stud being recessed with said flange seated within said recess.

9. An expansion dowel assembly, as set forth in claim 5, wherein said flange and fingers are formed as an integral member.

10. An expansion dowel assembly, as set forth in claim 9, wherein said flange and fingers are formed of a synthetic plastic material.

11. An expansion dowel assembly, as set forth in claim 5, wherein said second working part having a cylindrically shaped inner surface, said working surfaces on said first working part being planar, each said finger being segment-shaped in cross-section taken transversely of the axial direction of said stud and having an inwardly facing surface arranged to fit in surface contact with one of the planar working surfaces of said first working part and an arcuately shaped outwardly facing surface arranged to fit in surface contact with the inner surface of said second working part.

12. An expansion dowel assembly, as set forth in claim 1, wherein said first means comprises at least one shear pin.

* * * * *